(12) United States Patent
Kaemmer

(10) Patent No.: US 7,866,620 B2
(45) Date of Patent: Jan. 11, 2011

(54) HOLDER FOR A BEVERAGE CONTAINER

(75) Inventor: Hartwig Kaemmer, Waldachtal (DE)

(73) Assignee: Fischer Automotive Systems GmbH & Co. KG, Horb (DE)

( * ) Notice: Subject to any disclaimer, the term of this patent is extended or adjusted under 35 U.S.C. 154(b) by 189 days.

(21) Appl. No.: 12/256,001

(22) Filed: Oct. 22, 2008

(65) Prior Publication Data

US 2009/0146035 A1    Jun. 11, 2009

(30) Foreign Application Priority Data

Oct. 24, 2007   (DE) .................... 10 2007 050 787

(51) Int. Cl.
*A47G 1/10*    (2006.01)
(52) U.S. Cl. .................... 248/311.2; 248/314; 224/542; 224/282; 296/37.15
(58) Field of Classification Search ............ 248/309.1, 248/311.2, 316.3, 313, 310, 314; 224/282, 224/926, 552, 571, 542; 220/739, 903; 296/37.15
See application file for complete search history.

(56) References Cited

U.S. PATENT DOCUMENTS

| 3,749,466 | A | 7/1973 | Cadiou |
| 5,839,711 | A | 11/1998 | Bieck et al. |
| 6,250,527 | B1 | 6/2001 | Mizue et al. |
| 7,165,752 | B2 * | 1/2007 | Dobos .................... 248/311.2 |
| 7,380,762 | B2 * | 6/2008 | Takeichi ................ 248/311.2 |
| 7,487,945 | B2 * | 2/2009 | Liu et al. ............... 248/311.2 |

FOREIGN PATENT DOCUMENTS

| DE | 101 21 979 | 7/2002 |
| EP | 0 800 954 | 10/1997 |
| GB | 2 425 293 | 10/2006 |
| WO | 98/41421 | 9/1998 |

* cited by examiner

*Primary Examiner*—Gwendolyn Baxter
(74) *Attorney, Agent, or Firm*—Michael J. Striker

(57) ABSTRACT

A holder for a beverage container, such as, for example, a beverage can, which is intended for installation in a motor car, has pivotable and spring-actuated holding jaws pivotally mounted by a knife-edge bearing. As a result, a pivot axis close to the inner side of the container receptacle is possible, which facilitates pressing outward of the holding jaws by insertion of the beverage container. In addition, it allows snap-mounting of the holding jaws from below by of a spring tongue.

9 Claims, 3 Drawing Sheets

HOLDER FOR A BEVERAGE CONTAINER

CROSS-REFERENCE TO A RELATED APPLICATION

The invention described and claimed hereinbelow is also described in German Patent Application DE 10 2007 050 787.0 filed on Oct. 24, 2007. This German Patent Application, whose subject matter is incorporated here by reference, provides the basis for a claim of priority of invention under 35 U.S.C. 119(a)-(d).

BACKGROUND OF THE INVENTION

The invention relates to a holder for a beverage container.

Such a holder, which is intended for installation in a motor car, is known from EP 800 954 A2. The known holder has a cylindrical or tubular container receptacle for insertion of the beverage container/the shape of the container receptacle not being essential to the invention. A holding jaw is pivotally mounted in a wall of the container receptacle by means of a pivot bearing, the holding jaw being urged into the container receptacle by a spring element. On being inserted, a beverage container presses the holding jaw outwards against the spring force of the spring element. The spring element presses the holding jaw inwards against the periphery of the inserted beverage container and thus adapts the holder to the diameter of the beverage container.

The pivot bearing of the holding jaw of the known holder has a journal bearing: two journals project from the holding jaw co-axially on respective sides, which journals are located in seatings of the container receptacle which are open on the outside. "On the outside" is relative to the container receptacle and means on the side remote from the container receptacle. The minimum spacing of the pivot axis of the journal bearing from the inner side of the wall of the container receptacle is the wall thickness of the container receptacle and the radius of the journal.

It is desirable for the bearing axis of the pivot bearing of the holding jaw to be arranged as far as possible towards the inside relative to the container receptacle, because in that way a moment exerted on the holding jaw by a beverage container on being inserted into the container receptacle is at its greatest. The moment exerted on the holding jaw by the beverage container on being inserted is directed outwards against the spring force of the spring element and presses the holding jaw outwards, so that the beverage container can be inserted into the container receptacle.

SUMMARY OF THE INVENTION

The problem underlying the invention is therefore to propose a holder for a beverage container of the kind described above, the pivot bearing of which allows a pivot axis at or as close as possible to the inner side of the wall of a container receptacle of the holder.

That problem is solved according to the invention in that the pivot bearing of the holder according to the invention has a knife-edge bearing.

Knife-edge bearings are customary in scales or measuring apparatus. They have an edge, normally a straight edge, which is termed a knife edge and which defines the bearing axis. For the invention, neither an exactly positioned bearing axis nor low friction is the important factor; the knife edge of the knife-edge bearing does not require close tolerance nor does it need to be sharp-edged, but it can also be rounded, for example. The knife-edge bearing enables the pivot axis to be arranged at the inner side of the wall of the container receptacle of the holder or, at least, to be arranged a short distance outwards from the inner side of the wall of the container receptacle, without any components or elements of the bearing projecting inwards beyond the inner side of the wall of the container receptacle.

In one construction in accordance with the invention, the holder has a tongue on the free end of which the knife-edge bearing is located. The end face of the tongue can form the knife edge, the knife edge can be formed on the free end of the tongue or on the holding jaw. A further development of the invention provides a step on the holding jaw, by means of which the holding jaw is pivotally seated on the free end of the tongue. That construction in accordance with the invention enables the knife-edge bearing to be formed in a structurally simple and economical way and allows the pivot axis to be at or close to the inner side of the wall of the container receptacle. The tongue can be located in the same plane as the wall of the container receptacle, so that the knife-edge bearing has no parts projecting into the container receptacle.

In one construction in accordance with the invention, the pivot axis of the knife-edge bearing is located in the wall of the container receptacle as close as possible to the inner side. The pivot axis runs tangentially with respect to the container receptacle, the holding jaw is arranged in an "upright" position, the pivot axis is located in a lower region of the holding jaw.

One construction in accordance with the invention provides a seating in the holder for the holding jaw, which seating is open at the bottom. "At the bottom" is relative to an intended installation position of the holder. The seating is arranged on the outer side of the container receptacle and engages over the holding jaw, for example over a laterally projecting pin of the holding jaw, on the outer side. The seating secures the holding jaw from the outside, so that the holding jaw does not escape outwards from the knife-edge bearing. The seating holds the step of the holding jaw pivotally on the free end of the tongue and secures the pivot bearing against becoming detached.

Because the seating is open at the bottom, the holding jaw can be introduced into the seating for the holding jaw from below, that is to say in the opposite direction to the direction of insertion of a beverage container, along the outer side of the wall of the container receptacle. The mounting direction for the holding jaw is from bottom to top along the outer side of the wall of the container receptacle. The holding jaw is therefore suitable for automated mounting, with mounting being a simple, translational movement.

A further advantage of the invention is the possibility of mounting the holding jaw on a double-walled holder, in which the container receptacle is surrounded or, at least, partly covered by a wall, fascia or the like. The holding jaw can be introduced from below into an intermediate space between the container receptacle and the surrounding wall, fascia or the like. That enables the container receptacle to be manufactured integrally with a wall that surrounds it, a fascia that covers it towards the outside, or the like.

In one construction in accordance with the invention, the seating for the holding jaw and the tongue are integral components of the container receptacle and the tongue is a spring tongue which, on mounting of the holding jaw, snaps into place on the step of the holding jaw. Apart from the holding jaw and the container receptacle, no further individual components are required. Mounting is a simple translational movement until the tongue snaps into place; further mounting steps are unnecessary.

In a preferred construction in accordance with the invention, the holding jaw and the spring element form a pre-mountable structural unit. Separate mounting steps for the spring element are unnecessary.

Further features of the invention will be found in the following description of an exemplary embodiment in conjunction with the claims and the drawings. The individual features can be implemented singly or a plurality of features can be implemented in any combination in embodiments of the invention. It is not necessary to implement all the features of a claim in an embodiment of the invention. The problem posed can be modified with modification of the claims.

The invention will be described in detail below with reference to an exemplary embodiment shown in the drawings.

DESCRIPTION OF THE PREFERRED EMBODIMENTS

Figure 1:
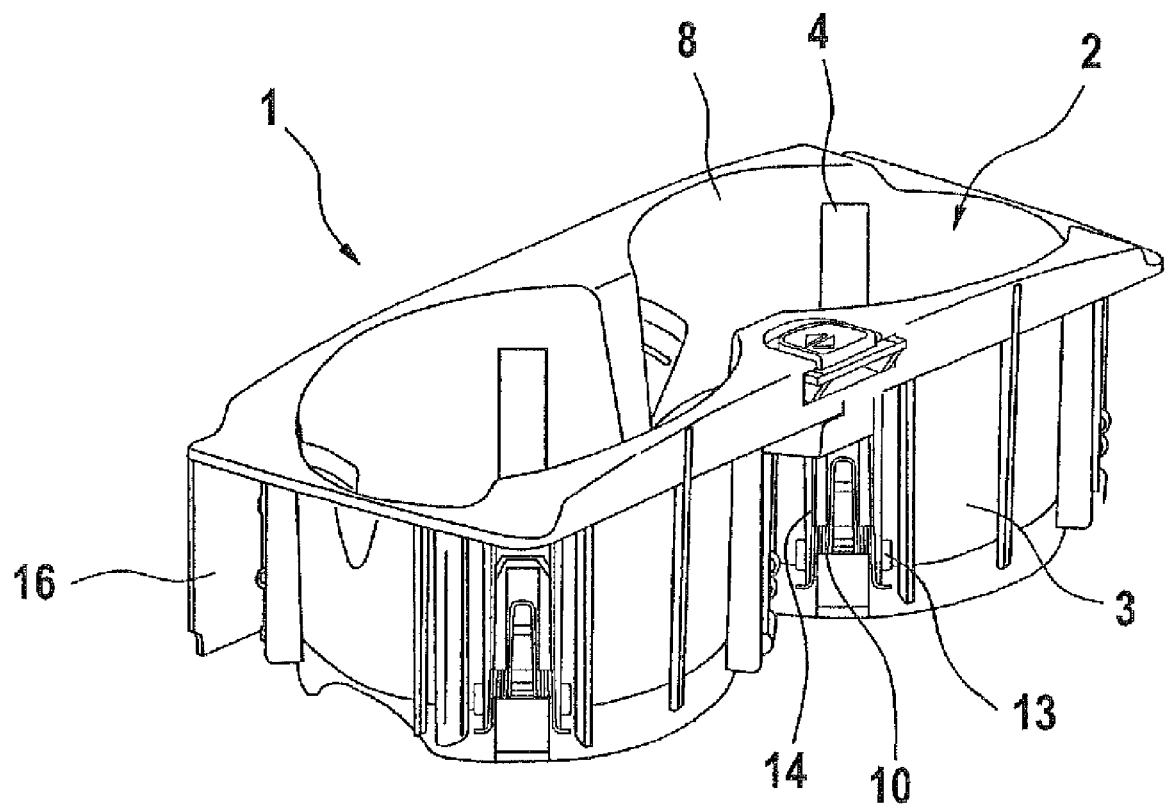
FIG. 1 is a perspective view of a holder according to the invention.

The holder 1 shown in FIG. 1 is intended for installation in a motor car (not shown) and is used for insertion of a beverage container (not shown), such as, for example, a beverage can, a beaker, a cup or a bottle, and for holding the beverage container secure against tipping over.

The holder 1 has, arranged one next to the other, two tubular container receptacles 2 open at the top, each for the insertion of a beverage container. In a tubular wall 3 of each of the container receptacles 2 there are arranged four spring-actuated holding jaws 4 which are offset relative to one another by 90° in the circumferential direction. For that purpose, the wall 3 has corresponding apertures. The holding jaws 4 are arranged in an upright position, that is to say they extend from the bottom to the top. The terms "bottom" and "top" are relative to an intended installation position of the holder 1.

In side view the holding jaws 4 are wedge-shaped (FIGS. 2 and 4) and, close to their lower ends, have a step 5 (FIG. 2) by means of which they return at a lower end of a holding face 6. The holding face 6 faces the interior of the container receptacle 2. The step 5 has a bead 7 which is triangular in side view and the edge of which forms the knife edge of a knife-edge bearing. The edge of the bead 7 defines a pivot axis of the knife-edge bearing; it is located almost in the same plane as the holding face 6 and is arranged only a short way outwards relative to the inner face 8 of the wall 3 of the container receptacle 2. The edge or knife-edge of the bead 7 defining the pivot axis is in any case located inside the wall 3 of the container receptacle 2. The pivot axis runs tangentially with respect to the container receptacle 2.

The bead 7 of the holding jaw 4 is seated on the end face on the free end of a spring tongue 9 which projects from below into the aperture for the holding jaw 4 in the wall 3 of the container receptacle 2. The spring tongue 9 is not shown in section. The spring tongue 9 is located in the same plane as the wall 3. The bead 7 on the underside of the step 5 of the holding jaw 4 and the end face, i.e. the free end, of the spring tongue 9, on which the bead 7 is linearly seated, form a knife-edge bearing about which the holding jaw 4 is pivotable.

Figure 2:
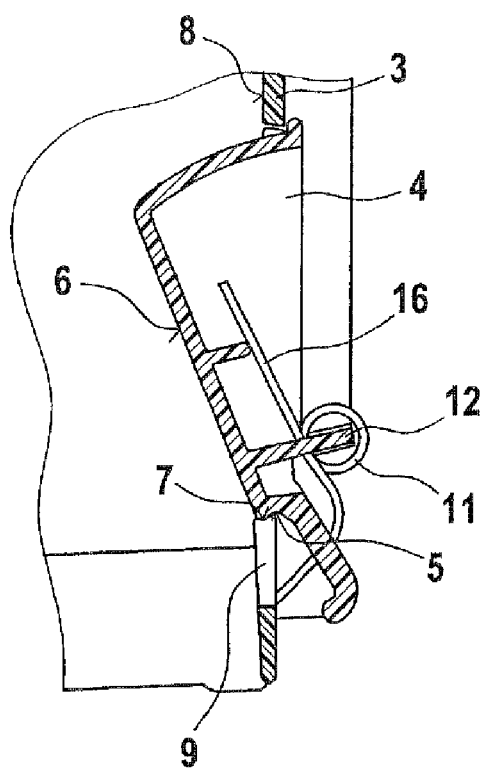
FIG. 2 shows, on an enlarged scale, a section through a holding jaw of the holder shown in FIG. 1.
Figure 3:
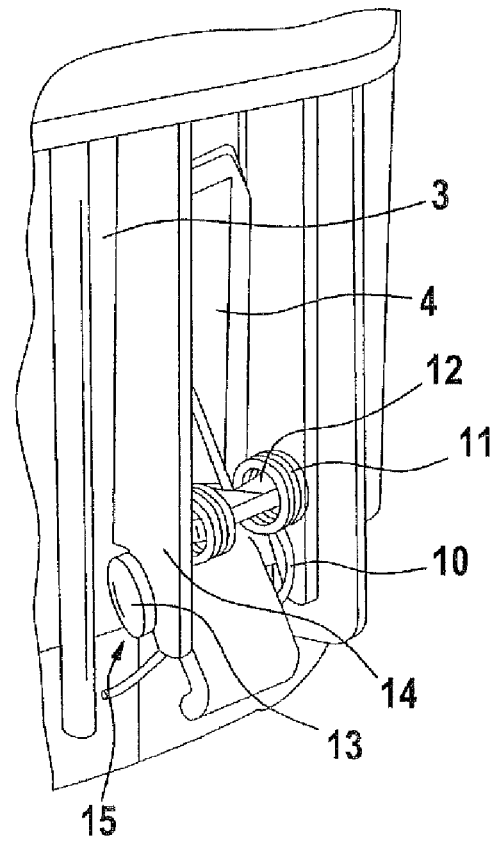
FIG. 3 is a perspective view of the holder shown in FIG. 1 in the region of the holding jaw.
Figure 6:
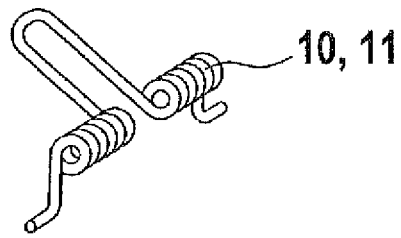
FIG. 6 is a perspective view of a spring element of the holding jaw of the holder shown in FIG. 1.

A double-leg spring 10, which is shown as an individual component in FIG. 6, forms a spring element which, as can be seen in FIG. 2, urges the holding jaw 4 into the container receptacle 2. On being inserted, a beverage container (not shown) strikes the holding jaw 4 from above and exerts thereon an outwardly directed moment which pivots the holding jaw 4 outwards against the spring force of the double-leg spring 10. The outwardly directed moment which the beverage container exerts on the holding jaw 4 on being inserted is the greater the further the pivot axis of the knife-edge bearing, that is to say the edge of the bead 7, is located towards the inside, that is to say close to the inner side of the wall 3.

Figure 4:
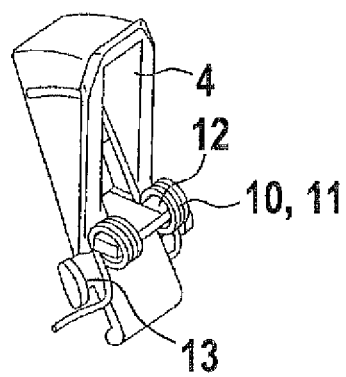
FIG. 4 is a perspective view of a holding jaw of the holder shown in FIG. 1 as an individual component.
Figure 5:
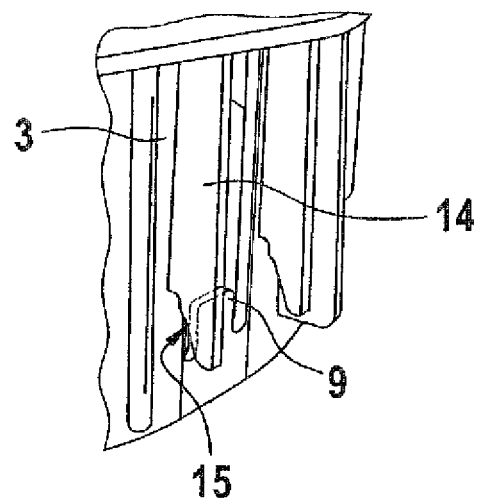
FIG. 5 shows the holder from FIG. 1 in the region of a holding jaw, the holding jaw not being shown.

The double-leg spring 10 is supported below the holding jaw 4 outside on the wall 3 and, as already mentioned, presses the holding jaw 4 inwards into the container receptacle 2. Spring coils 11 of the double-leg spring 10 are seated on laterally projecting tongues 12 on the outer or rear side of the holding jaw 4 remote from the container receptacle 2 (FIG. 4). In that way, the double-leg spring 10 is attached to the holding jaw 4, the double-leg spring 10 forms with the holding jaw 4 a pre-mountable or pre-mounted structural unit, as can be seen in FIG. 4.

The holding jaw 4 has pins 13 that project outwards co-axially on respective sides. Ribs 14, which are integral with the wall 3 of the container receptacle 2, engage over the pins 13 on the outer sides thereof remote from the container receptacle 2. The ribs 14 are arranged on both sides of the holding jaw 4 and run in the longitudinal direction of the container receptacle 2. At their lower ends, at their foot facing the wall 3, the ribs 14 are provided with recesses, the recesses forming seatings 15 for the pins 13 of the holding jaw 4, which seatings are open at the bottom. For mounting, the holding jaw 4 is moved into the aperture in the wall 3 from below along the outer side of the wall of the container receptacle 2, the holding face 6 pressing the spring tongue 9 resiliency inwards until the step 5 of the holding jaw 4 passes by the spring tongue 9. The spring tongue 9 snaps back so that the bead 7 on the underside of the step 5, which bead forms part of the knife-edge bearing, is seated on the end face of the spring tongue 9.

As already mentioned, the ribs 14 engage over the pins 13 of the holding jaw 4 on the outer sides thereof and thus secure the holding jaw 4 in the aperture in the wall 3 and also ensure that the knife-edge bearing is held together, that is to say that the bead 7 is seated on the end face of the spring tongue 9. In assembly, the double-leg spring 10 is already located on the holding jaw 4 and need not be mounted separately. Because mounting takes place as described from below along the outer side of the wall 3 of the container receptacle 2, the holding jaw 4 can be mounted even when the holder 1 is double-walled and the wall 3 is not accessible from the outside. That is the case, for example, when the wall 3 is enclosed by an outer wall (not shown) or the holder 1 has a fascia 16 on the outer side of the container receptacles 2, as can be seen in FIG. 1. The holder 1 is double-walled in the region of the fascia 16.

It will be understood that each of the elements described above, or two or more together, may also find a useful application in other types of constructions differing from the types described above.

While the invention has been illustrated and described as embodied in a holder for a beverage container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is Set forth on the appended claims.

1. A holder for a beverage container, comprising:
   a container receptacle for insertion of a beverage container;
   a holding jaw mounted so as to be pivotable a short distance into said container receptacle;
   a pviot bearing mounting said holding jaw to be pivotable;
   a spring element urging said holding jaw into said container receptacle, wherein said pivot bearing has a knife-edge bearing for the pivotal mounting of said holding jaw, and wherein said holder has a tongue having a free end, said knife-edge bearing being located on said free end of said tongue.

2. A holder for a beverage container as defined in claim 1, wherein said holding jaw has a step by which said holding jaw is pivotably seated on said free end of said tongue.

3. A holder for a beverage container as defined in claim 2, wherein said holder had a seating provided on an outer side of said container receptacle and configured for said holding jaw, said seating being opened at a bottom and engaging over said holding jaw on the outer side, and holding said step of said holding jaw seated pivotably on said free end of said tongue.

4. A holder for a beverage container as defined in claim 2, wherein said tongue is configured as a spring tongue which, on mounting of said holding jaw, snaps into place on said step of said holding jaw.

5. A holder for a beverage container as defined in claim 1, wherein said container receptacle has a wall, said knife-edge bearing having a pivot axis located in said wall of said container receptacle.

6. A holder for a beverage container as defined in claim 1, wherein said knife-edge bearing has a pivot axis which extends tangentially with respect to said container receptacle.

7. A holder for a beverage container as defined in claim 1, wherein said holding jaw and said tongue are integral components of said container receptacle formed in one piece with the latter.

8. A holder for a beverage container as defined in claim 1, wherein said holding jaw and said spring element form a pre-mountable structural unit.

9. A holder for a beverage container, comprising:
   a container receptacle for insertion of a beverage container;
   a holding jaw mounted so as to be pivotable a short distance into said container receptacle;
   a pivot bearing mounting said holding jaw to be pivotable;
   a spring element urging said holding jaw into said container receptacle, wherein said pivot bearing has a knife-edge bearing for the pivotal mounting of said holding jaw,
   wherein said holding jaw has a step by which said holding jaw is pivotably seated on said free end of said tongue, wherein said holder has a seating provided on an outer side of said container receptacle and configured for said holding jaw, said seating being opened at a bottom and engaging over said holding jaw on the outer side, and holding said step of said holding jaw seated pivotably on said free end of said tongue, and wherein said holder has a tongue having a free end, said knife-edge bearing being located on said free end of said tongue.

* * * * *